United States Patent
Kato et al.

(10) Patent No.: US 6,294,843 B1
(45) Date of Patent: Sep. 25, 2001

(54) CONTROL SYSTEM FOR A HYBRID VEHICLE

(75) Inventors: Shinji Kato; Morio Kayano, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/496,192

(22) Filed: Feb. 2, 2000

(30) Foreign Application Priority Data

Feb. 3, 1999 (JP) .................................................. 11-026712

(51) Int. Cl.⁷ ...................................................... H02P 9/04
(52) U.S. Cl. ............................ 290/40 C; 322/10; 322/16; 180/65.2
(58) Field of Search .................. 290/40 R, 40 A, 290/40 B, 40 C; 322/10, 16, 17; 180/65.1, 65.2, 65.3, 65.4

(56) References Cited

U.S. PATENT DOCUMENTS

| | | | |
|---|---|---|---|
| 3,991,357 | * 11/1976 | Kaminski | 320/32 |
| 5,786,640 | * 7/1998 | Sakai et al. | 290/17 |
| 5,841,201 | * 11/1998 | Tabata et al. | 290/40 C |
| 5,929,608 | * 7/1999 | Ibaraki et al. | 322/16 |
| 5,977,647 | * 11/1999 | Lenz et al. | 290/40 C |
| 6,177,773 | * 1/2001 | Nakano et al. | 318/376 |
| 6,230,496 | * 5/2001 | Hofmann et al. | 60/706 |

FOREIGN PATENT DOCUMENTS

| | | |
|---|---|---|
| 3-36936 | 2/1991 | (JP) . |
| 5-115131 | 5/1993 | (JP) . |
| 9-182311 | 7/1997 | (JP) . |
| 10-51971 | 2/1998 | (JP) . |

* cited by examiner

*Primary Examiner*—Nicholas Ponomarenko
(74) *Attorney, Agent, or Firm*—Arent Fox Kintner Plotkin & Kahn, PLLC

(57) ABSTRACT

The control system for the hybrid vehicle of the present invention, having an engine for producing a driving force for the vehicle, a motor for producing an assist driving force to assist the output from the engine, and a battery for supplying electric energy to the motor and storing energy regenerated by the motor which acts as a generator, the control system comprises: a voltage detector for detecting a voltage from the battery; a full charge judgement device for judging full charge of the battery based on the voltage detected by the voltage detector; a charging electric power variation detector for detecting variation in a charging electric power for charging the battery; and a full charge judgement prevention device for preventing judging of full charge when the charging electric power variation detector detects the variation in the charging electric power.

5 Claims, 8 Drawing Sheets

CONTROL SYSTEM FOR A HYBRID VEHICLE

BACKGROUND OF THE INVENTION

1. Field of the Invention

The present invention relates to a control system for a hybrid vehicle.

This application is based on Japanese Patent Application No. Hei 11-26712, the contents of which are incorporated herein by reference.

2. Description of the Related Art

In recent years, electric vehicles and hybrid vehicles have been developed in order to reduce the discharge of carbon dioxide, in consideration of the global warming effect. These vehicles have a motor which does not discharge any gas, and a battery for supplying electric energy.

To charge the battery, external chargers are used for the electric vehicles, while on-vehicle generators are used for the hybrid vehicles.

In parallel hybrid vehicles, driving motors act as the on-vehicle generators, while series hybrid vehicles employ generators rotated by the engines. In addition, hybrid vehicles which are chargeable by an external charger have been developed.

In the parallel hybrid vehicle, the motor assists the driving force from the engine when the vehicle accelerates, while the motor acts as a generator for regenerating electric power for the battery when the vehicle decelerates. The motor repeats the driving and regeneration, that is, the battery repeats charging and discharging. As the result, the battery may not be always fully charged. Because of the repetition of charging and discharging, the remaining charges in the cells in the battery may become unequal, and this inequality may degrade the performance of the battery. Therefore, it is necessary to equalize (refresh) the remaining charges in the cells in the battery.

In the conventional technique, the charges in the cells can be equalized by connecting an external charger to the vehicle and fully charging the battery.

To cope with the next assist or regeneration, the remaining charge in the battery is usually maintained within the medium range. When the vehicle continuously accelerates so that the motor continuously assists the engine, the remaining charge may be gradually decreased, and the battery must be charged later. An external charger can be used for this purpose.

In addition, when using the battery, it is necessary to know the full charge of the battery. Since the hybrid vehicle that is chargeable by the external charger is started after the battery was fully charged, it is inconvenient that the driver cannot know the full charge. Further, to charge the battery by power regenerated from the driving motor or by the rotation of the engine, it is important to detect the full charge state in order to calculate the charge remaining in the battery.

There are two conventional methods for detecting the full charge state.

One method detects the full charge based on the decrease in the voltage, utilizing the phenomenon that the voltage ($-\Delta V$) from the battery decreases when the battery is nearing the full charge,.

While the temperature of the battery increases when the battery is charged, the rate the temperature rises($dT/dt$) increases when the battery is nearing the full charge. The second conventional method, which utilizes this phenomenon, detects the full charge based on the rate the temperature rises.

In the following, the second conventional method will be explained.

Because the temperature rise may cause the deterioration of the battery or may shorten the life of the battery, the battery generally be cooled. To cool the battery, one method (air cooling) uses air outside or inside the vehicle as the coolant by appropriately positioning the battery in the vehicle. Another method (water cooling) uses a water jacket and a heat exchanger (radiator) with a specific coolant water. The temperature of the battery is adjusted by one of these methods. The second conventional method detects the rate the temperature rises when the temperature is controlled.

While the hybrid vehicle preferably uses an external charger which can constantly output a stable voltage when charging the battery, the external charger increases the cost of the vehicle.

Therefore, the battery should be charged by the generator rotated by the engine. To fully charge the battery, the engine is idled to actuate the generator, from which the electric power is supplied to the battery. However, the engine rotational speed may be irregular and unstable, and therefore the electric power produced thereby may fluctuate. Further, the electric power, which is generated by the generator rotated by the engine, may be consumed by other electric loads (e.g., a cooling fan, or an air conditioner). When these devices are operated during the charging of the battery, the charging voltage or current may fluctuate. Therefore, by the above-mentioned first conventional method, accurate detection of the full charge is impossible.

When cooling the battery, air outside or inside the vehicle may be used as the coolant. This method, however, must take into consideration water resistance and mud spatter, and this increases the number of parts for enhancing the cooling effect of the air conditioner. The air outside the vehicle is rarely used as the coolant because the packaging of the vehicle may be degraded. Mainly, the coolant is the air inside the vehicle. In this case, when the air conditioner may be started or stopped during the charging of the battery, or when the openings (e.g. the doors) of the carriage are opened and closed, the temperature of the air inside the vehicle may vary, affecting the temperature of the battery, which then may also vary. Therefore, by the above-mentioned second conventional method, accurate detection of the full charge is impossible.

BRIEF SUMMARY OF THE INVENTION

It is therefore an object of the present invention to provide a control system for a hybrid vehicle which can accurately detect the full charge even when electric power generated by a generator varies or an electric load varies.

It is another object of the present invention to provide a control system for the hybrid vehicle of the present invention which can equalize the unequal charges of batteries without a special charger.

In order to accomplish the above object, the control system for the hybrid vehicle of the present invention, having an engine for producing a driving force for the vehicle, a motor for producing an assist driving force to assist the output from the engine, and a battery for supplying electric energy to the motor and storing energy regenerated by the motor which acts as a generator, the control system comprises: a voltage detector (40) for detecting a voltage from the battery; a full charge judgement device (52) for judging a full charge of the battery based on the voltage detected by the voltage detector; a charging electric power variation detector (S20, S100, S102, and S104) for detecting variation in a charging electric power for charging the battery; and a full charge judgement prevention device (50) for preventing judging of full charge when the charging electric power variation detector detects a variation in the charging electric power.

According to the present invention, the control system detects the full charge of the battery, based on the decreasing of the voltage. The voltage detector detects the voltage from the battery, while the charging electric power variation detector detects the variation in the electric power from the battery, and the full charge judgment prevention device prevents the judging of the full charge when the charging electric power varies.

Because the judging of the full charge is prevented when the charging electric power varies, the full charge can be accurately judged, avoiding mis-detection.

In a second aspect of the present invention, the system further comprises: a charging electric power detector (42) for detecting the charging electric power from the product of the voltage from the battery and the electric current from the battery. The charging electric power variation detector detects the variation in the electric power, based on a variation in at least one of a rotational speed of the engine, the charging electric power, and an electric load driven by the electric power generated by the generator.

According to the present invention, the variation in the charging power is detected not only when the electric power, which is obtained from the product of the voltage and the electric current to the battery, varies, but also when the rotational speed of the engine or the electric load varies, and as the result the judging of the full charge is prevented. Therefore, the detection accuracy can be improved even when there are various changes in the conditions.

In a third aspect of the present invention, the system further comprises: a charging electric power detector (42) for detecting the charging electric power from the product of the voltage from the battery and the electric current from the battery; an electric power update device (46) for storing the detected charging electric power value when the voltage from the battery becomes maximum; and a comparator (48) for comparing the electric power value stored in the electric power update device with the electric power value detected by the charging electric power detector. The full charge judgement prevention device (50) prevents the judging of the full charge when the difference between the values compared by the comparator is greater than a predetermined value.

The present invention compares the electric power value corresponding to the maximum voltage from the battery with the present electric power detected by the electric power detector, and prevents the judging of the full charge when the difference is above the predetermined value. Therefore, the full charge can be detected more accurately.

As the charging voltage increases due to disturbances, the battery voltage increases, and when the charging voltage returns to the previous value, the battery voltage also decreases to the previous value. The decreasing of the battery voltage after a temporary increase of the charging voltage may cause a mis-detection of the full charge. This invention can avoid this mis-detection.

In a fourth aspect of the present invention, the system comprises: an input device (34) for inputting an equal charging starting command; and an equal charging device (steps S16 to S22) for fully charging the battery by the electric power generated by the motor as the generator while the engine is idled.

In a fifth aspect of the present invention, when the equal charging starting command is input while the vehicle is not parked (while in case of the automatic transmission a shift gear is at the parking position, or while the vehicle is being braked by a parking brake and a shift gear is at the neutral position), the equal charging device does not charge the battery.

Thus, the present invention can equalize the unequal charges of batteries without a special charger by fully charging the battery with an electric power generated by a generator (motor) rotated by the engine.

To start the charging to equalize the unequal charges in the sub-batteries, the equal charging starting command must be input. In response to the command, the vehicle (the engine and the motor/generator) enters the driving state for the equal charging. Thus, the vehicle can switch between the normal drive state in which the driver controls the vehicle and the equal charging state, which are therefore compatible.

DETAILED DESCRIPTION OF THE INVENTION

The embodiment of the control system for the hybrid vehicle (battery charger) of the present invention will be explained with reference to figures.

Figure 1:
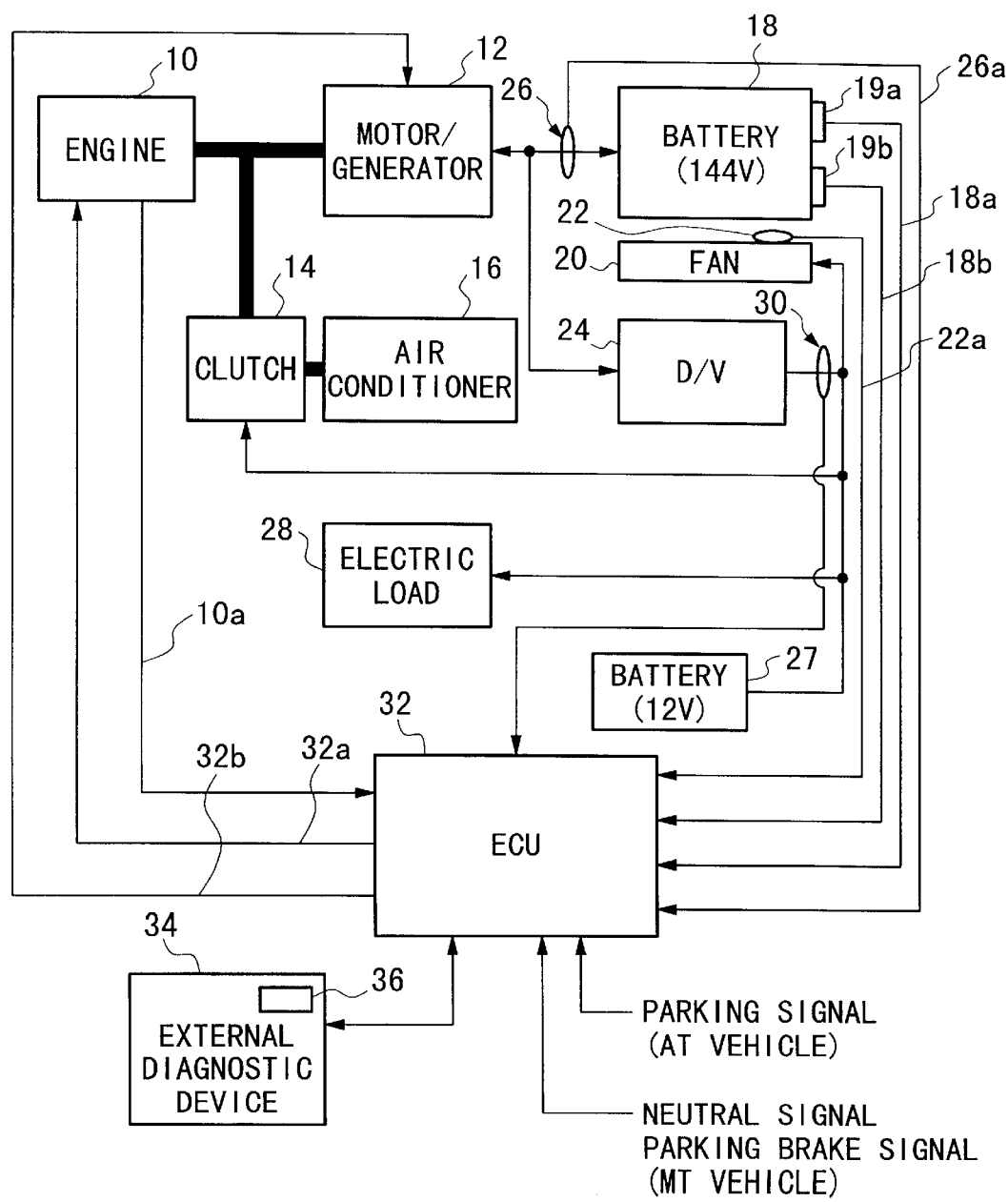
FIG. 1 is a block diagram showing the entire structure of the control system for the hybrid vehicle of the present invention.

FIG. 1 is a block diagrams showing the entire structure of the control system for the hybrid vehicle of the present invention. In this embodiment, the invention is applied, especially, to a hybrid vehicle in which a battery is charged by a generator rotated by an engine.

In FIG. 1, reference numeral 10 denotes an engine, from which driving force is transmitted via a transmission (not shown) to wheels (not shown), and is transmitted to a motor/generator 12, a clutch 14, and an air conditioner 16, which are directly connected to the rotational shaft of the engine. The motor/generator 12 is rotated by a battery 18 as an electric power source, and the rotation is transmitted via the transmission to the wheels as a driving force and to the clutch 14 and the air conditioner 16.

The motor/generator 12, rotated by the engine 10, generates electric power and acts as a charger for the battery 18. When the motor/generator 12 acts as the charger for the battery 18, the electric power of 500W is generated by the electromotive force of 144V. The battery 18 includes ten sub-batteries connected in series, and outputs 144V. The battery 18 further includes a voltage detector 19a for detecting the voltages output from the respective sub-batteries, and a temperature detector 19b for detecting the temperatures of the respective sub-batteries. The air conditioner 16 receives the driving forces from the engine 10 and from the motor/generator 12, which rotates the compressor (not shown) in the air conditioner 16. The battery 18 has a fan 20. This fan 20 cools the battery 18 to adjust its temperature. Near the fan 20, a temperature detector 22 for detecting the temperature around the battery 18 is provided.

While the motor/generator 12 is electrically connected to the battery 18, a downverter 24 and a current detector 26 are provided therebetween. The downverter 24 converts the voltage of 144V generated by the motor/generator 12 and the voltage from the battery 18 into a voltage of 12V. The current detector 26 detects the electric current output from the battery 18 and the electric current (regenerated electric current) flowing into the battery 18. The downverter 24 is connected to a battery 27 whose output voltage is 12V. The battery 27 is charged by the output from the downverter 24. The fan 20, the clutch 14, and the electric load 28 are connected to the downverter 24 and the battery 27. That is, the output from the battery 27 drives the fan 20, the clutch 14, and the electric load 28. The electric load 28 includes, e.g., a car stereo audio device, wipers, or a power door. A current detector 30 for detecting the output electric current from the downverter 24 is provided at the output terminal of the downverter 24.

The electric current detected by the current detector 26 is sent through a signal line 26a. The voltage detected by the voltage detector 19a for the battery 18 is sent through a signal line 18a. The temperature detected by the temperature detector 22 is sent through a signal line 22a. The electric current detected by the current detector 30 is sent through a signal line 30a. The rotational speed Ne output from a rotation detector (not shown) attached to the engine 10 is sent through a signal line 10a. All of these signals are input to an ECU 32.

The ECU 32 controls the engine 10 and the motor/generator 12, based on the input signals. Specifically, through a signal line 32a connected to the engine 10, the ECU 32 controls an amount of fuel to be supplied to the engine 10 and the ignition timing of plugs to adjust the engine rotational speed. When controlling the idling, the engine rotational speed is set to, e.g., 1200rpm. Further, the ECU 32 controls the rotational speed of the motor/generator 12 through a signal line 32b. When charging the battery 18, the output from the motor/generator 12 is adjusted to 500W. The ECU 32 is achieved by a general computer with a CPU, a RAM, and a ROM.

An external diagnostic device 34 instructs to the ECU 32 whether to charge the battery to the full charge point by the electric power generated by the motor/generator 12 when the engine is idling. The external diagnostic device 34 is prepared in a service facility, and is connected by a service person to the ECU 32 through a connection that is not shown. The full charging process is performed to restore the decreased remaining charge in the battery to the full charge, or to equalize all the remaining charges in the sub-batteries when the remaining charges in the sub-batteries connected in series are unequal (the remaining charges differs between the sub-batteries).

The external diagnostic device 34 has a lamp 36 for indicating that the battery is fully charged. The ECU 32 receives a parking signal when the vehicle has an automatic transmission. When the vehicle has a manual transmission, the ECU 32 receives a neutral signal indicating that the transmission is at the neutral position, and a side brake signal indicating that the parking brake is turned on.

While in this embodiment the available external diagnostic device 34 is used as an input device for inputting the equal charging starting command, the equal charging starting command may be input to the ECU 32 by a simple switch. In this case, the switch may be provided near the ECU 32 and may be preferably arranged so that the driver cannot easily operate the switch.

The control system for the hybrid vehicle in the ECU 32 of the present invention will now be explained.

Figure 2:
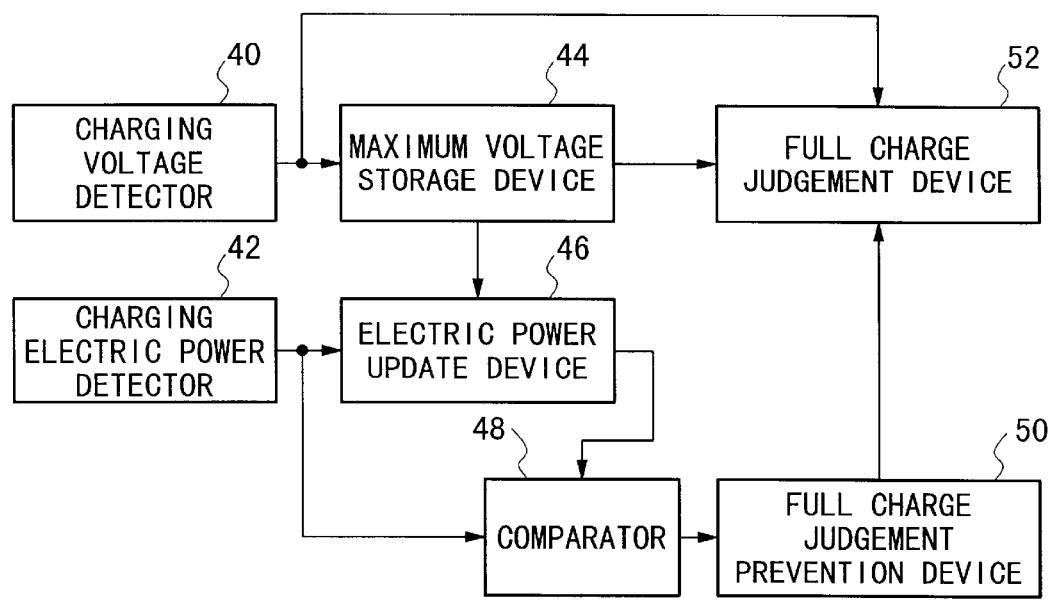
FIG. 2 is a block diagram showing the functions of the control system for the hybrid vehicle of the present invention.
Figure 3:
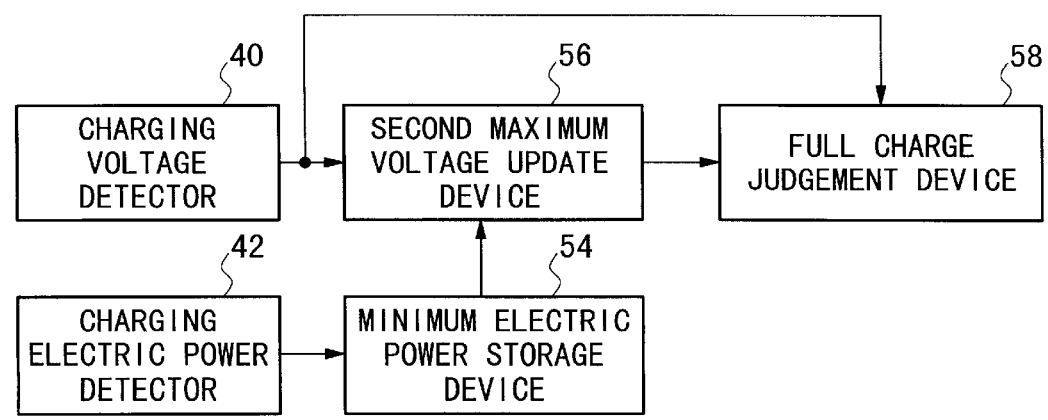
FIG. 3 is a block diagram showing the functions of the control system for the hybrid vehicle of the present invention.

FIGS. 2 and 3 are diagrams showing the functions of the control system for the hybrid vehicle of the present invention.

In FIG. 2, reference numeral 40 denotes a charging voltage detector, which corresponds to the voltage detector 19a, attached to the battery 18 in FIG. 1. Reference numeral 42 denotes a charging electric power detector which corresponds to the current detector 26 shown in FIG. 1. Reference numeral 44 denotes a maximum voltage storage device which stores the maximum voltage value output from the charging voltage detector 40. Reference numeral 46 denotes an electric power update device, which is connected to the charging electric power detector 42, and the maximum voltage storage device 44, and stores the electric power value output from the charging electric power detector 42. Whenever the maximum voltage stored in the maximum voltage storage device 44 is updated, the electric power update device 46 updates the electric power value output from the charging electric power detector 42.

Reference numeral 48 denotes a comparator for comparing the electric power value, output from the charging electric power detector 42, with the electric power value stored in the electric power update device 46, to thereby output the result of the comparison. These charging electric power detector 42, the electric power update device 46, and the comparator 48 form a charging electric power variation detector. Reference numeral 50 denotes a full charge judgement prevention device for preventing the judgement of the full charge, based on the result of the comparison output from the comparator 48.

Reference numeral 52 denotes a full charge judgement device which is connected to the charging voltage detector 40 and the maximum voltage storage device 44, and judges, based on the output voltages from them, whether the battery 18 has reached the full charge or not. The judgement of the full charge by the full charge judgement device 52 is not performed when the full charge judgement prevention device 50 prevents the full charge judgement.

The structure shown in FIG. 3 will be explained. In FIG. 3, parts like or corresponding to those shown in FIG. 2 are denoted by the same reference characters and the description thereof will be omitted.

The minimum electric power storage device 54 is connected to the charging electric power detector 42, and stores the minimum electric power value output from the charging electric power detector 42. Reference numeral 56 denotes a second maximum voltage update device (minimum electric power maximum voltage update device) which stores the maximum voltage value output from the charging voltage detector 40. Whenever the minimum electric power value stored in the minimum electric power storage device 54 is updated, the second maximum voltage update device 56 updates the voltage value from the charging voltage detector 40. A full charge judgement device 58 judges the full charge in a manner similar to the full charge judgement device 52 in FIG. 2, and differs from the device 52 in that the output from the full charge judgement prevention device is not input. The full charge judgement device 58 is connected to the charging voltage detector 40 and the second maximum voltage update device 56, and judges whether the battery 18 has reached the full charge based on their voltage values.

The operation of the control system for the hybrid vehicle of the present invention will now be explained.

Figure 4:
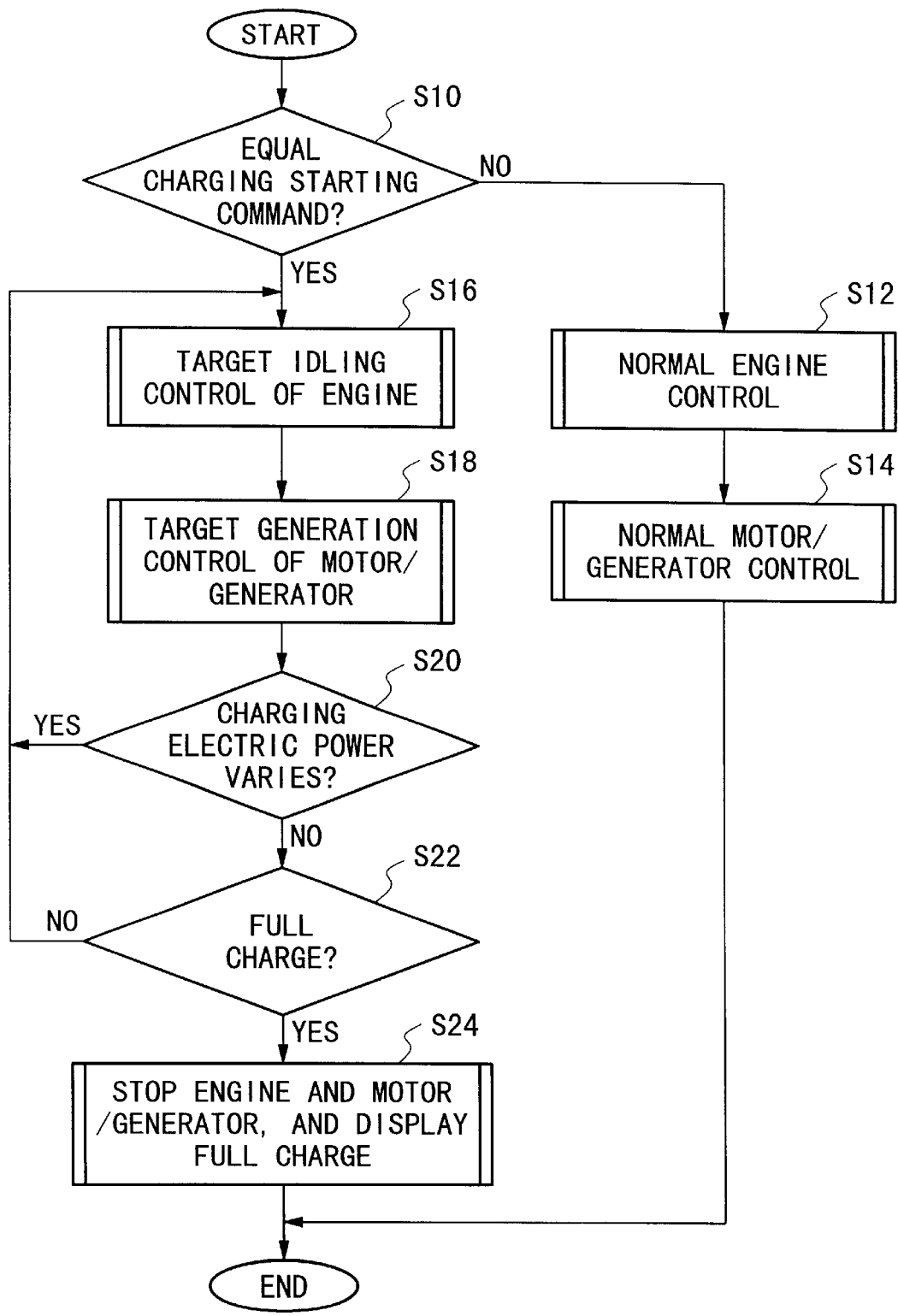
FIG. 4 is a flowchart showing the operation of the control system for the hybrid vehicle of the present invention.

FIG. 4 is a flowchart showing the operation of the control system for the hybrid vehicle of the present invention. The process shown in FIG. 4 is repeated at a regular interval, e.g., 1 sec.

Initially, the ECU 32 receives the parking signal (in case of the automatic transmission vehicle), or the neutral signal and the parking brake signal (in case of the manual transmission vehicle), and further receives from the external diagnostic device 34 in FIG. 1 the signal for executing the judging of the full charge. Then, the ECU 32 determines whether an equal charging starting command is received or not (step S10). When in step S10 the determination is "NO", the flow proceeds to step S12. Then, the ECU 32 normally controls the engine in step S12, and normally controls the motor/generator in step S14. That is, in step S10, because the ECU 32 determines that the signal for executing the judging of the full charge has not been input or that the vehicle is being normally driven, the engine and the motor/generator are normally controlled. The term "equal charging" used in this specification and the figures means reliably fully charging the battery 18. In other words, it means that, by avoiding a mis-judgement of the full charge due to the fluctuation in the charging voltage or the electric load, the full charge is not erroneously detected when the battery is not in the actual full charge state.

On the other hand, when in step S10 the determination is "YES", that is, when the vehicle is stopped and the input of the equal charging starting command is detected by the ECU 32, the flow proceeds to step S16. In step S16, the ECU 32 outputs a control signal to the engine 10 through the signal line 32a in FIG. 1, to set the engine to a predetermined idling state. In this idling state, the rotational speed of the engine 10 is maintained at, e.g., 1200 rpm.

Then, the flow proceeds to step S18, in which, by the control through the signal line 32b, the ECU 32 adjusts the electric power generated by the motor/generator 12 to a predetermined value. For example, by the control operation, the output from the motor/generator 12 becomes 144V and the generated electric power (the charging electric power for the battery 18) becomes 500W. Then, the flow proceeds to step S20, in which it is determined whether the charging electric power varies or not. This step is to avoid a mis-judgement of the full charge due to the variations in the charging electric power. This step S20 will be explained in more detail next.

Figure 5:
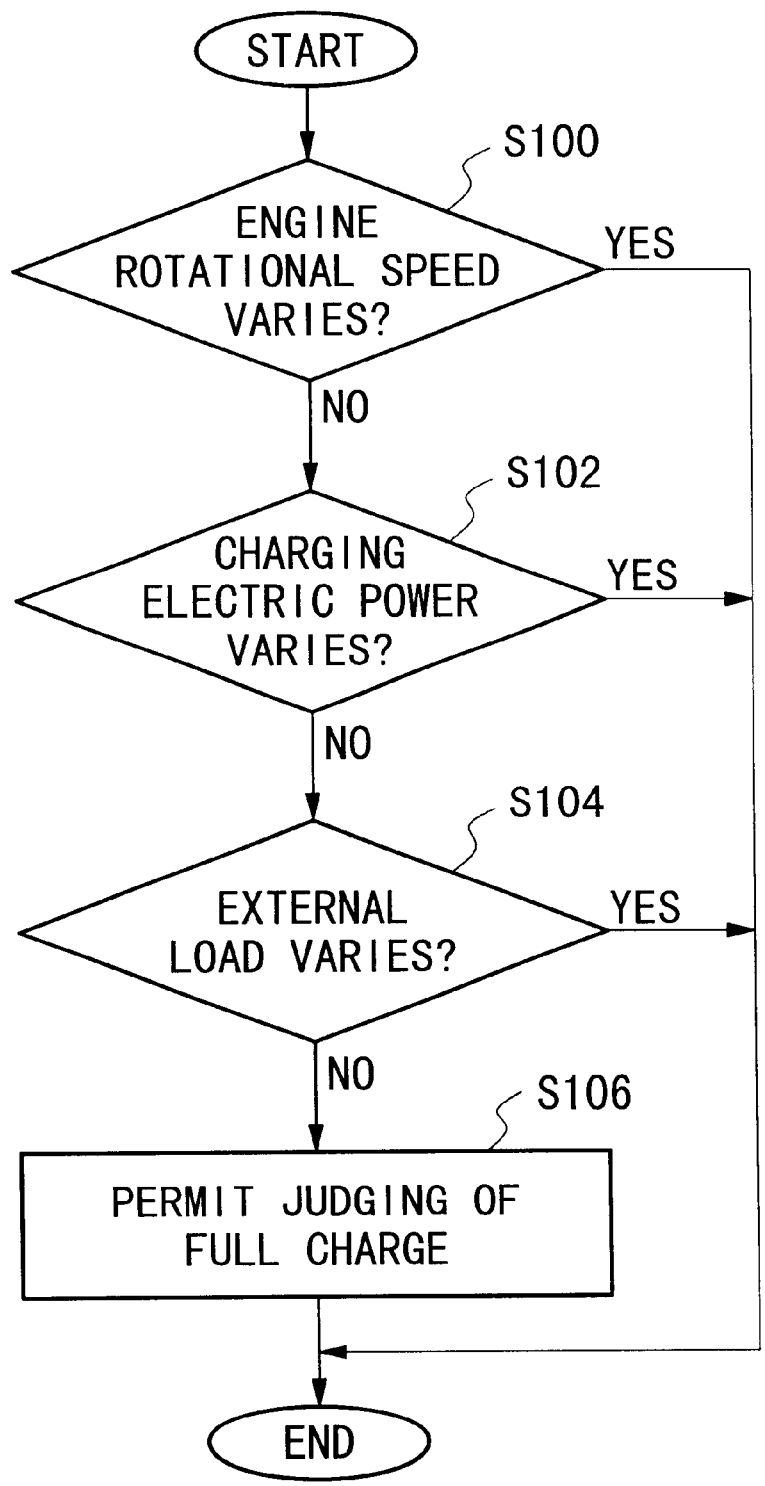
FIG. 5 is a flowchart showing in more detail the process of step S20 in FIG. 4 for determining whether the charging electric power varies or not.

FIG. 5 is a flowchart showing the process of step S20 in FIG. 4 of determining whether the charging electric power varies or not. The determination of whether the charging electric power varies or not is made, based on not only the variations in the charging electric power but also the variations in the engine rotational speed and in the external load. That is, in the broad sense, the variations in the charging electric power may be caused by the variations in the engine rotational speed and by the external load.

Figure 8A:
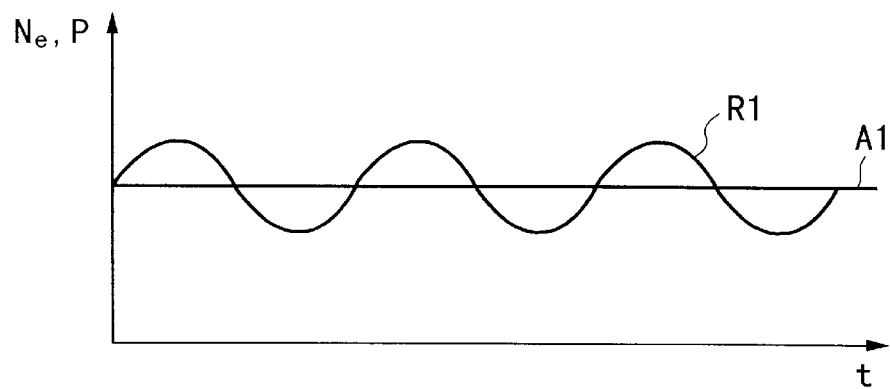
FIGS. 8A to 8C are diagrams for explaining the variations in the charging voltage in the broad sense in the present invention.
Figure 8B:
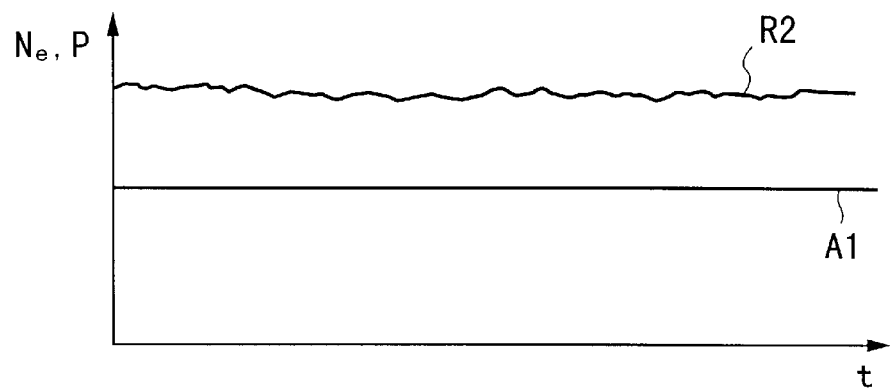
Figure 8C:
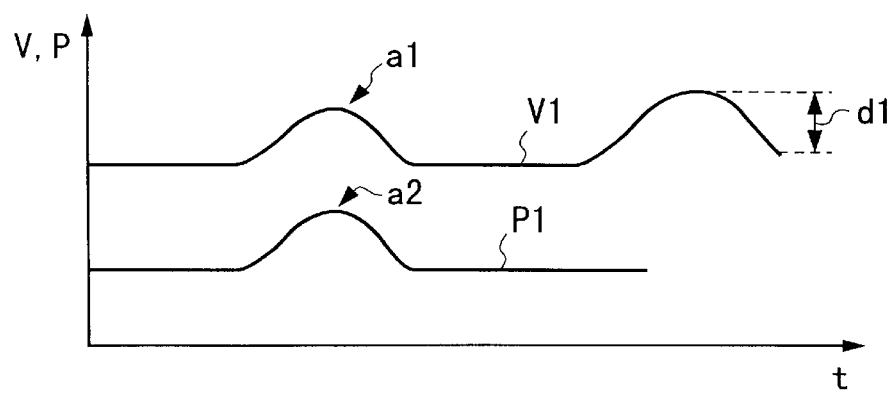

FIGS. 8A to 8C are diagrams for explaining the variations in the charging voltage in the broad sense. In FIGS. 8A to 8C, the horizontal axis represents time. In FIGS. 8A and 8B, the vertical axis represents the engine rotational speed or the electric power, while in FIG. 8C the vertical axis represents the voltage or the electric power.

First, FIG. 8A will be explained. In FIG. 8A, the straight line A1 represents the target engine rotation al speed and the target electric power to be generated by the motor/generator 12 when the engine 10 is idling. From the characteristics of the engine 10, the rotational speed is rarely constant as represented by the straight line A1, and actually pulsates as represented by the winding line R1. Therefore, when the battery 18 is charged by the electric power indicated by R1 in FIG. 8A and the full charge is judged based on the $-\Delta V$ phenomenon depending on the characteristics of the battery, this leads to the mis-judgement.

In FIG. 8B, the straight line A2 represents the target engine rotational speed and the target electric power to be generated by the motor/generator 12 when the engine 10 is idled. The zigzag line R2 represents the engine rotational speed and the generated electric power which are higher than the targets of the engine rotational speed and the electric power represented by the line A1. In the situation shown in FIG. 8B, the battery 18 is charged by more than the normal rated power (500W), and therefore the full charge cannot be accurately judged.

In FIG. 8C, the partially curved line V1 represents the voltage detected by the voltage detector 19a, and the partially curved line P1 represents the electric power calculated based on the electric current detected by the current detector 26. The maximum values a1 and a2 appear when the electric load is actuated or stopped. The portion d1 in FIG. 8C represents the occurrence of the $-\alpha V$ phenomenon depending on the characteristics of the battery 18. Therefore, when the full charge of the battery is judged based on the portion with the maximum value a1, the full charge may be erroneously detected even when the battery is not actually fully charged.

Returning to FIG. 5, the process for determining whether the charging electric power varies or not will be explained. In step S100 in FIG. 5, it is determined whether the engine rotational speed varies or not. For example, as indicated by R1 in FIG. 8A, the variations in the rotational speed of the engine 10 are detected. This step is performed, based on the signal sent from the engine 10 through the signal line 10a to the ECU 32. Because the driving force from the engine 10 is transmitted through the clutch 14 to the air conditioner 16, the engine rotational speed varies as the load on the engine varies depending on the on-off state of the air conditioner 16. When in step S100 the determination is "NO", that is, when the engine rotational speed does not vary, the flow proceeds to step S102, in which it is determined whether the charging electric power varies or not. This charging electric power is calculated, based on the detected electric current value input through the signal line 26a from the current detector 26 and on the detected voltage value input through the signal line 18a from the voltage detector 19a of the battery 18. The determination in step S102 is made, based on whether the result of the calculation varies or not. For example, this process is for detecting the offset of the zigzag line R2 from the straight line A1 which represents the target rotational speed of the engine 10 and the target generated electric power in FIG. 8B.

When in step S102 the determination is "NO", the flow proceeds to step S104. In step S104, it is determined whether the external load varies or not. Here, this external load indicates an electrical load. The variation in the external load is detected based on the electric current detected by the current detector 30 provided for the downverter 24. Because the electric power is supplied to the external load (the electrical load 28) from the battery 27 and the downverter 24, the variation in the external load electric current is detectable based on the detected value of the current detector 30 provided with the downverter 24. This process is to detect the instant maximum value as shown in FIG. 8C.

When in step S104 the determination is "NO", the flow proceeds to step S106 to permit the judging of the full charge. That is, the flow proceeds to step S22 in FIG. 4.

On the other hand, when in any one step S100, S102, and S104 the determination is "YES", the process shown in FIG. 5 is completed, the determination in step S20 in FIG. 4 becomes "YES", and the flow returns to step S16. This process is for preventing the judging of the full charge because the charging electric power in the broad sense varies.

While in FIG. 5 the variations in the charging electric power are judged by the combination of steps S100, S102, and S104, any one or more judgement steps may be combined.

The process in FIG. 5 is completed, and the flow proceeds to step S22 in FIG. 4, in which it is judged whether the battery has reached the full charge. The judgement of the full charge is made by detecting the decrease in the voltage from the battery. In the following, the details of this process will be explained.

[First Embodiment of Judging Full Charge]

The first embodiment of judging full charge utilizes the ($-\Delta V$) phenomenon in which the voltage from the battery decreases when the battery is nearing the full charge. The first embodiment detects the decrease in the voltage. That is, it is determined whether the decrease in the voltage value, which was output from the voltage detector 19a provided with the battery 18, exceeds a predetermined threshold value ($-\Delta V$) or not. When the determination is "NO", the flow proceeds to step S16.

When the determination is "YES", the flow proceeds to step S24, where the engine 10 and the motor/generator 12 are stopped. In addition, the indication of the full charge is displayed. In this process, in FIG. 1, the ECU 32 outputs the indication signal to the external diagnostic device 34, and the lamp 36 is lighted. Thus, the driver can know, based on the lighting of the lamp 36, that the charging is completed.

Figure 6:
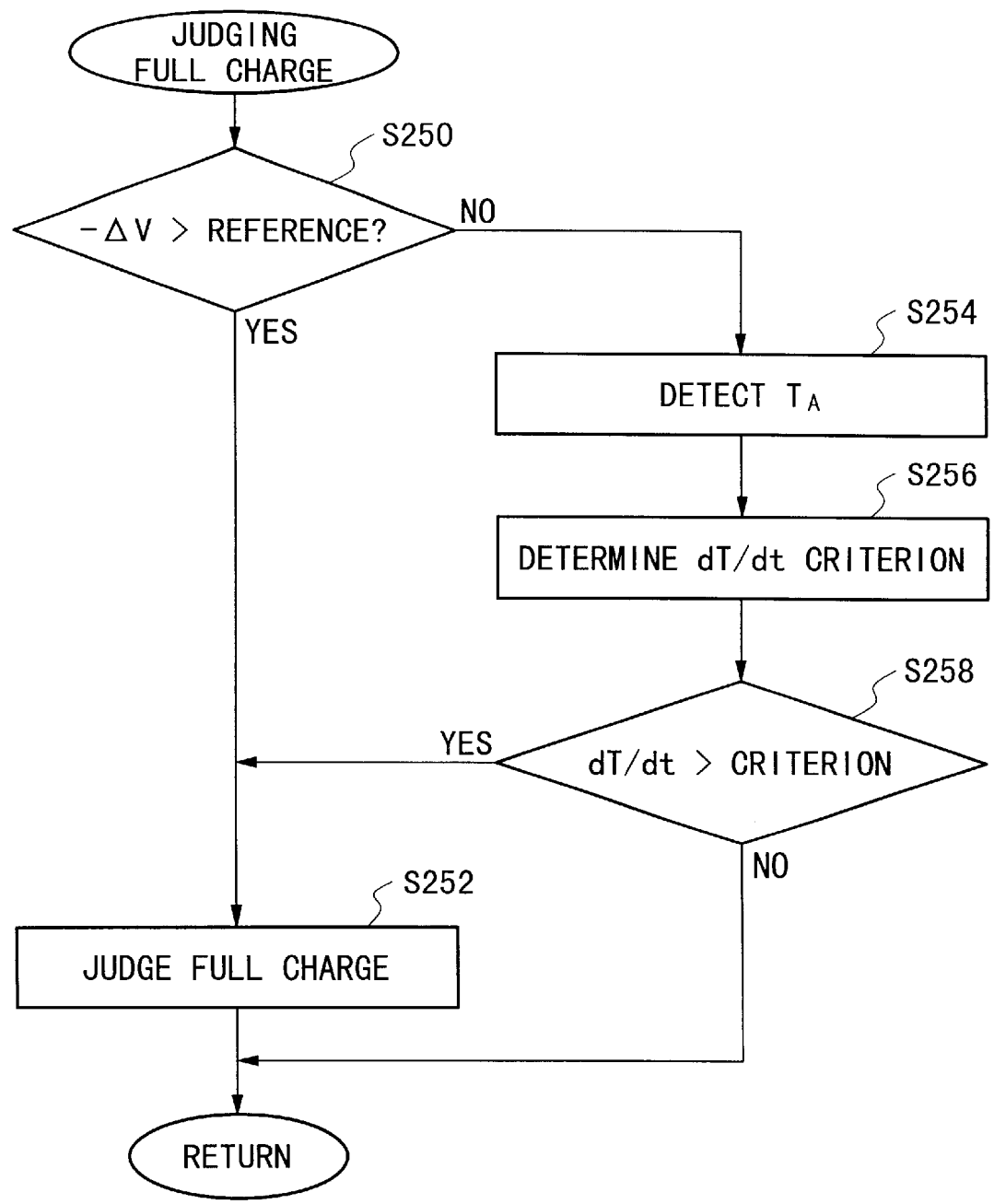
FIG. 6 is a flowchart showing in more detail the process of step S22 in FIG. 4 for judging the full charge based on the variation in the temperature around the battery.

While the above process is the basic process for judging the full charge, step S22 in this embodiment further includes a process shown in FIG. 6.

In this process, the full charge is judged based on the temperature rise of the battery as failsafe, even when the variation (decrease) in the voltage cannot be detected. As the battery is nearing the full charge, the charging electric power is not stored in the battery and is consumed in electrolyzing the electrolyte (water), and therefore the temperature rises. This temperature rise is detected in the process.

Further, the value for determining the temperature rise is corrected based on the atmospheric temperature (air temperature) $T_A$ around the battery, thereby preventing the degradation of the detection accuracy due to the variation in the temperature inside the vehicle (which is caused by, e.g., the operation of the air conditioner 16).

FIG. 6 is a flowchart showing the process for judging the full charge, based on the variations in temperature of the battery 18, in step S22 in FIG. 4.

The process shown in FIG. 6 utilizes the phenomenon in which the rate that temperature rises (dT/dt) increases when the battery is nearing the full charge, and judges the full charge based on this phenomenon. The ECU 32 judges the full charge based on the detected temperature input from the temperature detector 22 in FIG. 1 through the signal line 22a and on the detected temperature input from the temperature detector 19b, provided with the battery 18, through the signal line 18b.

Once the process is started, in step S250 the above-described $-\Delta V$ is detected, and it is determined whether the $-\Delta V$ is greater than a predetermined value. When the determination is "YES", the flow proceeds to step S252, in which it is judged that the battery 18 is in the full charge state, and then the flow returns to the process in FIG. 4.

On the other hand, when in step S250 the determination is "NO", the temperature detector 22 detects the temperature $T_A$ around the battery 18 in step S254.

In step S256, based on the temperature $T_A$ detected in step S254, the criterion (dT/dt value) for judging whether the battery is in the full charge state or not is defined.

In the following, step S256 will be explained.

Figure 7:
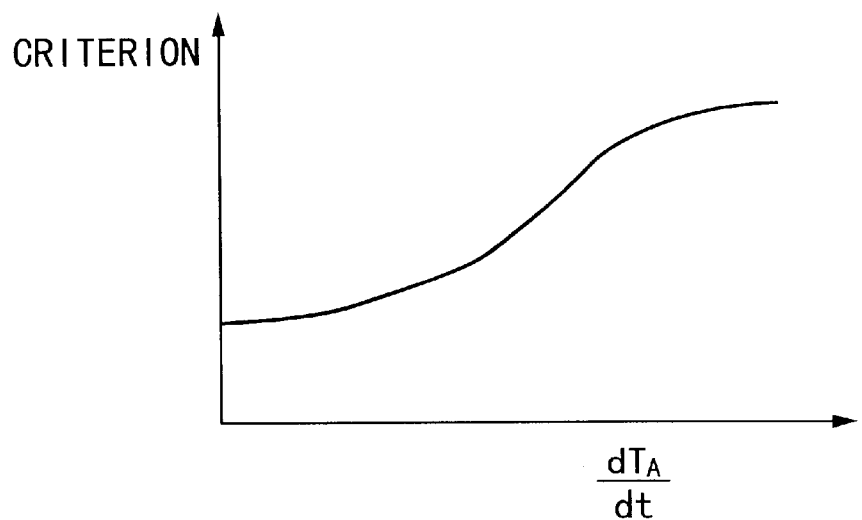
FIG. 7 is a graph showing the relationship between the criterion for judging the full charge and the rate of change in the temperature around the battery in the present invention.

FIG. 7 is a diagram showing the relationship between the criterion for judging the full charge and the rate of change in the temperature $T_A$. As shown in FIG. 7, the criterion varies as the temperature $T_A$ varies. The criterion does not always increase in proportion to the rate of change in the temperature $T_A$, and increases non-linearly. That is, as the rate of change in the temperature $T_A$ is high, the criterion becomes higher.

In step S256, the rate of change in the temperature $T_A$ detected in step S254 is calculated, and the criterion (dT/dt value) for judging the full charge of the battery is obtained from the graph of FIG. 7, based on the calculated rate of change in the temperature $T_A$.

In step S258, it is determined whether the rate of change in the temperature, which was detected by the temperature detector 19b of the battery 18, is greater than the criterion determined in step S256. When in step S258 the determination is "YES", the flow proceeds to step S252, and it is determined that the battery is in the full charge state. When in step S258 the determination is "NO", the determination of the full charge is not performed. That is, based on the temperature $T_A$ around the battery, the change in the temperature of the coolant (which is the air inside the vehicle as described above) is detected, and, taking into consideration this change in the temperature of the coolant, the criterion for judging the full charge is changed, avoiding the misdetection of the full charge. Thus, although the full charge is detected based on the change in the temperature, the misdetection can be avoided.

[Second Embodiment of Judging Full Charge]

The second embodiment of judging full charge shown in step S22 in FIG. 4 will now be explained.

Figure 9:
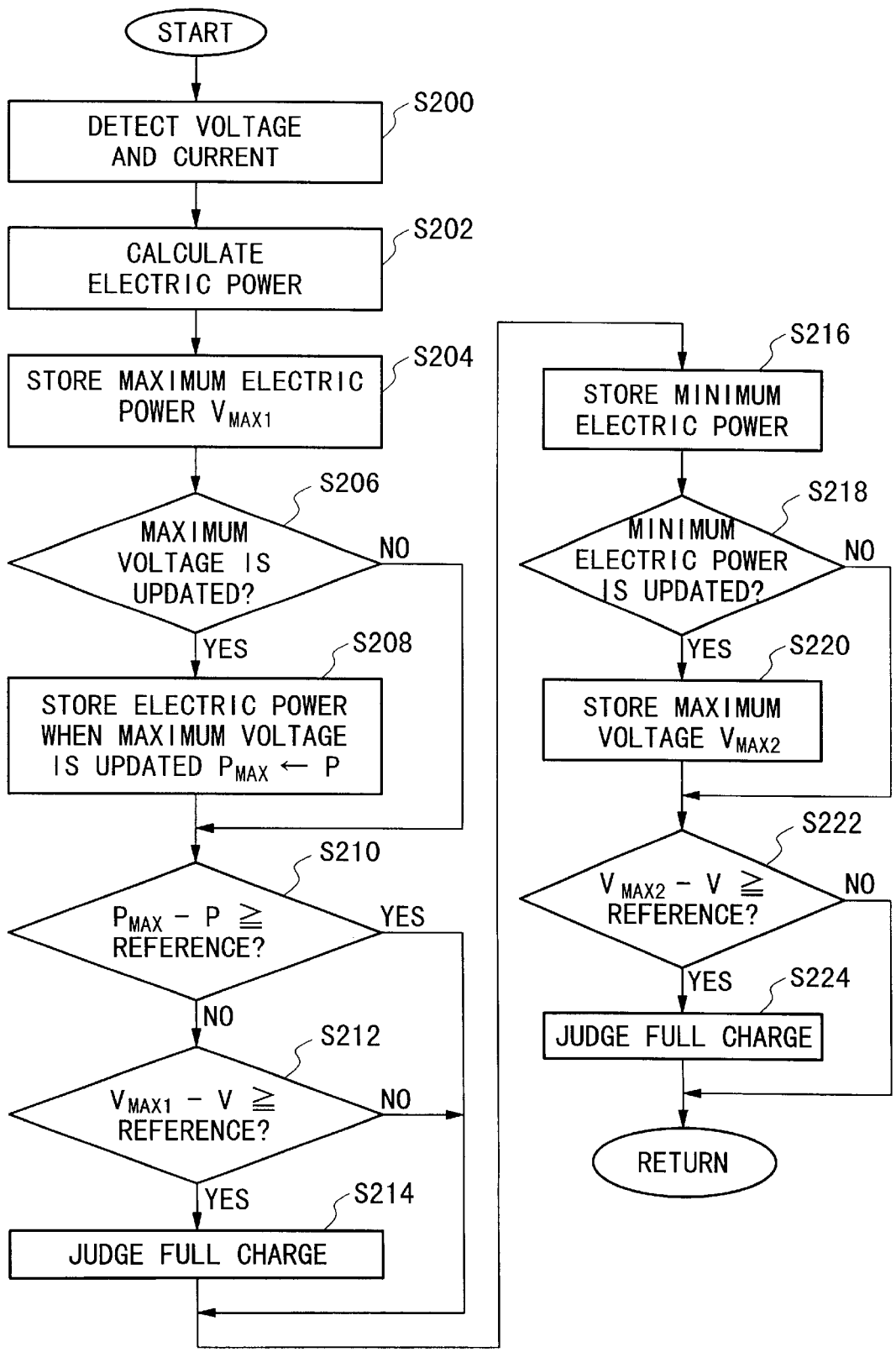
FIG. 9 is a flowchart showing the second embodiment of step S22 in FIG. 4 for judging the full charge.

FIG. 9 is a flowchart showing the second embodiment of judging the full charge in step S22 in FIG. 4.

As the charging voltage increases due to a disturbance, the battery voltage increases, and when the charging voltage decreases to the previous value, the battery voltage also decreases to the previous value. When the full charge is detected based on the decrease in the voltage as shown in the first embodiment, the decreasing of the battery voltage after the temporary increase of the charging voltage may cause a mis-detection of the full charge. The second embodiment of judging the full charge shown in the FIG. 9 can avoid this mis-detection.

Once the process for judging the full charge is commenced, the charging voltage detector 40 (see FIG. 2) detects the voltage output from the battery 18. The charging electric power detector 42 detects the electric current flowing into the battery 18 (step S200). Then, based on the electric current detected by the charging current detector 42, the electric power is calculated (step S202).

In step S204, the maximum voltage storage device 44 stores the maximum voltage $V_{MAX1}$ from among the detected voltages. When the voltage value detected at present is less than the maximum voltage $V_{MAX1}$ stored in the past, the maximum voltage $V_{MAX1}$ is not updated. In step S206, it is determined whether the maximum voltage storage device 44 updates the maximum voltage or not. When this determination is "YES", the flow proceeds to step S208, and then the value detected by the charging electric power detector 42 is stored as $P_{MAX}$ by the electric power update device 46 when the maximum voltage is updated. When in step S206 the determination is "NO", step S208 is skipped.

The flow proceeds to step S210, and the comparator 48 compares the value $P_{MAX}$, stored by the electric power update device 46, with the electric power value detected by the charging electric power detector 42. In other words, it is determined whether the value $P_{MAX}-P$ is equal to or above a predetermined value when P represents the electric power detected by the charging electric power detector 42. The predetermined value in step S210 is, e.g., the maximum variation in the electric power due to the variation in the external load. This value was obtained in advance by experiment.

When in step S210 the determination is "YES", the comparator 48 sends the notification indicating the result of the determination to the full charge judgement prevention device 50, which then prevents judging the full charge. Thus, when in step S210 in FIG. 9 the determination is "YES", the judging of the full charge in step S214 is not performed.

When in step S210 the determination is "NO", the flow proceeds to step S212. In step S212, the full charge judgement device 52 compares the maximum voltage $V_{MAX1}$, which is stored in the maximum voltage storage device 44, with the voltage detected by the charging voltage detector 40. In other words, it is determined whether the value $V_{MAX1}-V$ is equal to or above a predetermined value when V represents the voltage detected by the charging voltage detector 40. This step is to detect $-\Delta V$ depending on the characteristics of the battery 18, and when in this step the determination is "YES", the full charge judgement device 52 judges that the battery 18 is in the full charge state in step 214.

When in step S212 the determination is "NO", step S214 of judging of whether or not the battery is in the full charge state is skipped.

Then, the flow proceeds to step S216, and the minimum electric power storage device 54 in FIG. 3 stores the minimum electric power from among the detected electric power values. When the electric power value detected by the charging electric power detector 42 is equal to or above the minimum electric power value stored previously, the value is not updated. In step S218, it is determined whether the minimum electric power storage device 54 updated the minimum electric power or not. When this determination is "YES", the flow proceeds to step S220, and when the minimum electric power is updated, the second maximum voltage update device 56 sets $V_{MAX2}$ to the value detected by the charging voltage detector 40. When in step S218 the determination is "NO", step S220 is not performed.

The flow proceeds to step S222, in which the full charge judgement device 58 compares the maximum voltage $V_{MAX2}$, which is stored in the second maximum voltage update device 56, with the voltage value detected by the charging voltage detector 40. In other words, it is determined whether the value $V_{MAX2}-V$ is equal to or above a predetermined value when V represents the voltage value detected by the charging voltage detector 40. This step is to detect the $-\Delta V$ depending on the characteristics of the battery 18. When the determination is "YES", the full charge judgement device 58 determines in step S224 that the battery 18 is in the full charge state.

When in step S222 the determination is "NO", the judging of the full charge in step S214 is not performed.

Next, the operation shown in FIG. 9 will be specifically explained by way of a concrete example in which the voltage and the electric power vary.

Figure 10:
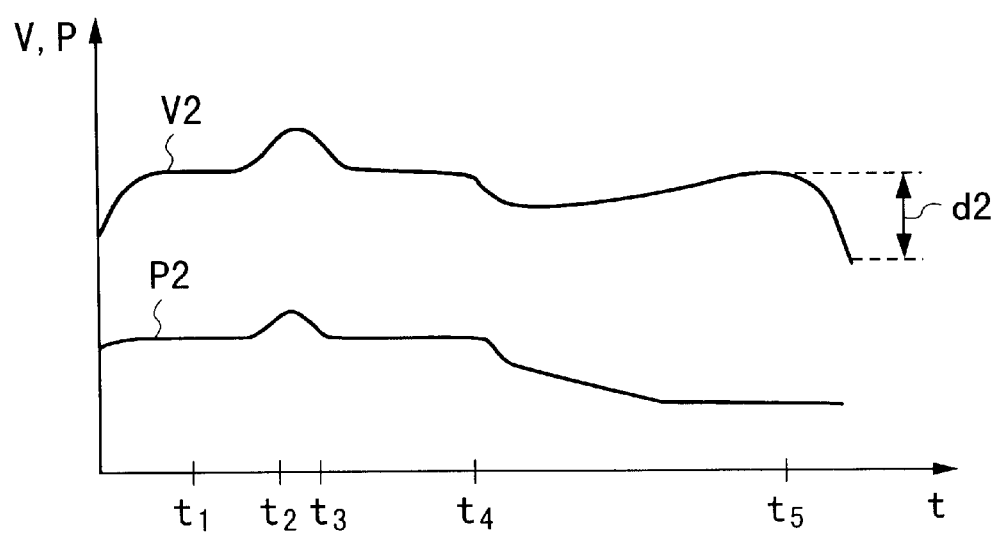
FIG. 10 is a graph showing an example of variations in the charging electric power and in the charging voltage in the present invention.

FIG. 10 is a diagram showing the variations in the charging electric power and the charging voltage.

FIG. 9 is a diagram showing in detail the process in step S22 in FIG. 4. Because the process in step S22 is called at a predetermined interval, the following description is made on the assumption that the process shown in FIG. 9 is repeated.

In FIG. 10, reference character V2 denotes a curving line which represents the voltage detected by the voltage detector 19a of the battery 18 (the charging voltage detector 40 in FIG. 2). Reference character P2 denotes a curving line which represents the electric power calculated based on the electric current detected by the current detector 26. In FIG. 10, the portion d2 corresponds to the $-\Delta V$ phenomenon depending on the characteristic of the battery 18.

Once the charging of the battery 18 is started, the voltage detected by the charging voltage detector 40 increases (the period from 0 to $t_1$). In this period, the maximum voltage storage device 44 performs step S204 for storing and updating the maximum voltage value $V_{MAX1}$. Whenever the maximum voltage value $V_{MAX1}$ is updated, the electric power update device 46 determines in step S206 whether the maximum voltage was updated or not, and updates the value $P_{MAX}$ when the determination is "YES." Because in this period the value $P_{MAX}-P$ is not equal to or above the predetermined value, the determination in step S210 becomes "NO", and in step S212 it is determined whether the value $V_{MAX1}-V$ is equal to or above the predetermined value. In the period from 0 to $t_1$, the determination in step S212 is "NO", and the flow proceeds to step S216. Because, as shown by the curving line P2 in FIG. 10, the electric power is increasing in this period, the minimum electric power is not updated in step S216, the determination in step S218 becomes "NO", and it is determined in step S222 whether the value $V_{MAX1}-V$ is equal to or above the predetermined value. This determination becomes "NO", and the flow returns to the process of FIG. 4.

At the point of time $t_2$, the electric load varies, and the maximum values appear in the voltage and in the electric power as shown in the figure. In step S204, the maximum value shown in FIG. 10 is stored as the maximum voltage $V_{MAX1}$. After the maximum value is stored in the maximum voltage storage device 44, the electric power update device 46 stores the electric power value at the point of storing the maximum value in step S208. In the example shown in FIG. 10, the maximum voltage $V_{MAX1}$ is the value at the point $t_2$.

After the maximum value is stored in the maximum electric power storage device 44, it is determined in step S210 whether the value $P_{MAX}$–P is equal to or above the predetermined value. At the point of time t2, the determination is "NO", the flow proceeds to step S212, and then it is determined whether the value $V_{MAX1}$–V is equal to or above the predetermined value. At the point of time $t_2$, the determination is "NO."

Between the points $t_2$ and $t_3$, the voltage and the electric power is decreasing, and the values $P_{MAX}$–P and $V_{MAX1}$–V are increasing. In the example shown in FIG. 10, when the value $P_{MAX}$–P is greater than a predetermined value, the determination in step S210 becomes "YES", and the steps S212 and S214 are not performed. That is, in step S210, because the variation in the electric power is significant, the judging of the full charge based on the –ΔV is prevented.

As the charging is continued and reaches the point of time $t_4$ in FIG. 10, the electric power shows a tendency to gradually decrease, while the voltage shows a tendency to increase and then decrease.

When the electric power decreased, in step S216 the minimum electric power stored in the minimum electric power storage device 54 is updated. Between the points $t_4$ and $t_5$, the voltage increases as shown in FIG. 10, the voltage value stored in the second voltage update device 56 is updated in steps S218 and S220. Then, it is determined in step S222 whether the value $V_{MAX2}$–V is equal to or above the predetermined value. In the period between $t_4$ and $t_5$, the determination in step S222 is "NO", and the flow returns to the process in FIG. 4.

At the point of time $t_5$, the electric power is decreasing, and the voltage starts to decrease. After the point of time $t_5$, the maximum voltage $V_{MAX2}$ stored in the second maximum voltage update device 56 is the voltage value at the point of time $t_5$. After the point of time $t_5$, the voltage is decreasing so that the value $V_{MAX2}$–V is greater than the value d2 in FIG. 10. At this point, the determination in step S222 becomes "YES", and flow proceeds to step S224 to perform the judging of the full charge. Therefore, according to the embodiment, even when the voltage and the electric power vary at the point of time $t_2$, the mis-judgement of the full charge can be avoided. Thus, the accuracy of the detection of the full charge can be improved.

When the judging of the full charge shown in FIG. 9 is completed and the full charge is judged, the flow returns to step S24, the engine 10 and the motor/generator 12 are stopped. Further, the full charge is indicated through the display. In this process, the ECU 32 in FIG. 1 sends the signal to the external diagnostic device 34, which then turns on the lamp 36. The driver can know the completion of the charging by the lighting of the lamp 36.

Thus, the control system for the hybrid vehicle of the present invention can equalize the unequal charges of batteries without a special charger by fully charging the battery with electric power generated by a generator (motor) rotated by the engine.

To start the charging to equalize the unequal charges in the sub-batteries, the equal charging starting command must be input. In response to the command, the vehicle (the engine and the motor/generator) enters the state for the equal charging. Thus, the vehicle can switch the normal drive state in which the driver controls the vehicle and the equal charging state, which are therefore compatible.

This invention may be embodied in other forms or carried out in other ways without departing from the spirit thereof.

The present embodiments are therefore to be considered in all respects illustrative and not limiting, the scope of the invention being indicated by the appended claims, and all modifications falling within the meaning and range of equivalency are intended to be embraced therein.

What is claimed is:

1. A control system for a hybrid vehicle having an engine for producing a driving force for said vehicle, a motor for producing an assist driving force to assist the output from said engine, and a battery for supplying electric energy to said motor and storing energy regenerated by said motor which acts as a generator, said control system comprising:

voltage detector for detecting a voltage from said battery;

full charge judgement device for judging the full charge of said battery based on the voltage detected by said voltage detector;

charging electric power variation detector for detecting variation in a charging electric power for charging said battery; and full charge judgement prevention device for preventing judging of full charge when said charging electric power variation detector detects the variation in the charging electric power.

2. A system according to claim 1, further comprising:

charging electric power detector for detecting the charging electric power from the product of the voltage and the electric current to the battery, wherein said charging electric power variation detector for detecting the variation in the electric power based on a variation in at least one of a rotational speed of said engine, the charging electric power, and an electric load driven by the electric power generated by said generator.

3. A system according to claim 1, further comprising:

charging electric power detector for detecting the charging electric power from the product of the voltage from the battery and the electric current from the battery;

electric power update device for storing the detected charging electric power value when the voltage from said battery becomes maximum; and comparator for comparing the electric power value stored in said electric power update device with the electric power value detected by said charging electric power detector, wherein said full charge judgement prevention device prevents the judging of the full charge when the difference between the values compared by said comparator is greater than a predetermined value.

4. A control system for a hybrid vehicle having an engine for producing a driving force for said vehicle, a motor for producing an assist driving force to assist the output from said engine, and a battery for supplying electric energy to said motor and storing energy regenerated by said motor which acts as a generator, said control system comprising:

input device for inputting an equal charging starting command; and equal charging device for fully charging said battery by the electric power generated by said motor used as the generator while said engine is idling.

5. A system according to claim 4, wherein, when the equal charging starting command is input while said vehicle is not parked, said equal charging device does not charge said battery.

* * * * *